United States Patent
Siomina et al.

(10) Patent No.: US 9,467,803 B2
(45) Date of Patent: Oct. 11, 2016

(54) DETECTING MULTIPATH AND DETERMINING POSITIONING MEASUREMENT UNCERTAINTY

(71) Applicants: Iana Siomina, Solna (SE); Yang Zhang, Shanghai (CN)

(72) Inventors: Iana Siomina, Solna (SE); Yang Zhang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 233 days.

(21) Appl. No.: 13/704,130

(22) PCT Filed: Sep. 27, 2012

(86) PCT No.: PCT/CN2012/082132
§ 371 (c)(1),
(2) Date: Dec. 13, 2012

(87) PCT Pub. No.: WO2014/047824
PCT Pub. Date: Apr. 3, 2014

(65) Prior Publication Data
US 2014/0087754 A1 Mar. 27, 2014

(51) Int. Cl.
*H04W 4/02* (2009.01)
*G01S 5/02* (2010.01)

(52) U.S. Cl.
CPC .............. *H04W 4/02* (2013.01); *G01S 5/021* (2013.01); *G01S 5/0205* (2013.01); *G01S 5/0215* (2013.01)

(58) Field of Classification Search
CPC ...... H04W 64/00; H04W 4/02; G01S 5/0215
USPC ........................................... 455/456.1–456.6
See application file for complete search history.

(56) References Cited

U.S. PATENT DOCUMENTS 6,108,557 A * 8/2000 Wax et al. ................. 455/456.2
7,139,583 B2 * 11/2006 Yamasaki et al. ......... 455/456.1

(Continued)

FOREIGN PATENT DOCUMENTS

CN 1413057 A 4/2003
CN 1953610 A 4/2007
(Continued)

OTHER PUBLICATIONS

3rd Generation Partnership Project. 3GPP TS 36.355 V10.4.0 (Dec. 2011). 3rd Generation Partnership Project; Technical Specification Group Radio Access Network; Evolved Universal Terrestrial Radio Access (E-UTRA); LTE Positioning Protocol (LPP) (Release 10). Dec. 2011.

*Primary Examiner* — Nathan Mitchell
(74) *Attorney, Agent, or Firm* — Murphy, Bilak & Homiller, PLLC

(57) ABSTRACT

Techniques are disclosed for determining measurement uncertainty of and/or multipath effects on positioning measurements, based on the residual deviations between timing measurements and high-accuracy location results. An example method begins with collecting (510) a plurality of timing measurements or ranging measurements, or both, each measurement corresponding to at least one anchor node antenna having a known location. A measurement deviation is determined (520) for each measurement by comparing the measurement to a corresponding reference location. The measurement deviations are used (530) to estimate measurement quality for one or more subsequent positioning measurements, and/or uncertainty associated with one or more subsequent positioning estimates, and/or an effect of multipath on subsequent positioning measurements or estimates. In some embodiments, a covariance matrix is calculated from the measurement deviations and is used to determine statistical information or multipath effects for measurements corresponding to a particular one of the anchor node antennas.

34 Claims, 6 Drawing Sheets

(56) References Cited

U.S. PATENT DOCUMENTS

| | | | |
|---|---|---|---|
| 8,305,215 B2* | 11/2012 | Markhovsky et al. | 340/572.1 |
| 8,532,677 B2* | 9/2013 | Halfmann et al. | 455/456.6 |
| 8,554,246 B2* | 10/2013 | Boyer et al. | 455/456.1 |
| 8,570,904 B2* | 10/2013 | Lemkin et al. | 370/255 |
| 2004/0157621 A1* | 8/2004 | Yamasaki et al. | 455/456.1 |
| 2010/0168764 A1* | 7/2010 | Jacobs et al. | 606/130 |
| 2011/0143770 A1* | 6/2011 | Charbit et al. | 455/456.1 |
| 2011/0207477 A1 | 8/2011 | Siomina et al. | |
| 2012/0225676 A1* | 9/2012 | Boyd | G01S 5/0205 455/456.6 |
| 2013/0130710 A1* | 5/2013 | Boyer et al. | 455/456.1 |
| 2013/0172007 A1* | 7/2013 | Wax et al. | 455/456.1 |
| 2013/0273938 A1* | 10/2013 | Ng et al. | 455/456.1 |

FOREIGN PATENT DOCUMENTS

| | | |
|---|---|---|
| EP | 1447678 A1 | 8/2004 |
| WO | 0246788 A2 | 6/2002 |
| WO | 2011/105946 A1 | 9/2011 |

* cited by examiner

DETECTING MULTIPATH AND DETERMINING POSITIONING MEASUREMENT UNCERTAINTY

TECHNICAL FIELD

The present invention relates generally to wireless communication networks and in particular to networks and devices performing signal timing measurements for positioning estimation.

BACKGROUND

The development of technologies to determine the position of a mobile device has enabled application developers and wireless network operators to provide location-based and location-aware services. Examples of these are guiding systems, shopping assistance, friend finder, presence services, community and communication services and other information services that give the mobile user information about his or her surroundings or that use this information to enhance their services.

In addition to the commercial services facilitated by these technologies, location-based emergency services are also being deployed. The governments in several countries have put specific requirements on the network operators to be able to determine the position of an emergency call. For instance, governmental requirements in the United States specify that mobile networks must be able to determine the position of a certain percentage of all emergency calls and further include accuracy requirements. The requirements make no distinctions between indoor and outdoor environment.

In many environments, the position can be accurately estimated by using positioning methods based on Global Navigation Satellite Systems (GNSS), such as the well-known Global Positioning System (GPS). However, GPS-based positioning may often have unsatisfactory performance, especially in urban and/or indoor environments. Complementary positioning methods may also be provided by a wireless network to augment GPS technology. In addition to mobile terminal-based GNSS (including GPS), the following methods are currently available or will be soon be included in the Long-Term Evolution (LTE) standards developed by the 3$^{rd}$-Generation Partnership Project (3GPP):

Cell ID (CID),
E-CID, including network-based angle-of-arrival (AoA),
Assisted-GNSS (A-GNSS), including Assisted-GPS (A-GPS), based on satellite signals,
Observed Time Difference of Arrival (OTDOA),
Uplink Time Difference of Arrival (UTDOA)—currently being standardized.

Several positioning techniques are based on time-difference-of-arrival (TDOA) or time-of-arrival (TOA) measurements. Examples include OTDOA, UTDOA, GNSS, and Assisted-GNSS (A-GNSS). A typical, though not the only, format for the positioning result with these techniques is an ellipsoid point with an uncertainty circle/ellipse/ellipsoid, which is the result of intersection of multiple hyperbolas/ hyperbolic arcs (e.g., OTDOA or UTDOA) or circles/arcs (e.g., UTDOA, GNSS, or A-GNSS).

Several techniques, such as Adaptive Enhanced Cell Identity (AECID), may involve a mix of any of the methods above, and are thus regarded as "hybrid" positioning methods. With these methods, the position result can be almost any shape, but in many cases it is likely to be a polygon.

Cellular-based positioning methods (as opposed to satellite-based methods, for example) rely on knowledge of anchor nodes' locations, i.e., the fixed locations from which measured signals are transmitted (e.g., for OTDOA) or the fixed locations at which signals transmitted by mobile devices are measured (e.g., for UTDOA). These fixed locations may correspond, for example, to base station or beacon device locations for OTDOA, Location Measurement Unit (LMU) antenna locations for UTDOA, and base station locations for E-CID. The anchor nodes' location may also be used to enhance AECID, hybrid positioning, etc.

Observed Time-Difference-of-Arrival (OTDOA) Positioning

With OTDOA, a terminal measures the timing differences for downlink reference signals received from multiple distinct locations. For each measured neighbor cell, the terminal, referred to as "user equipment" or "UE," in 3GPP terminology, measures a Reference Signal Time Difference (RSTD). This RSTD is the relative timing difference between transmissions received at the UE from neighbor cell and transmissions received from the reference cell. The UE position estimate can then be found as the intersection of hyperbolas corresponding to the measured RSTDs. Measurements on signals transmitted from three geographically dispersed base stations are needed to solve for two coordinates of the terminal and the receiver clock bias. These base stations should have a good geometry relative to the UE, i.e., each should have a substantially different azimuth from the others.

In order to solve for the UE's position, precise knowledge of the transmitter locations and transmit timing offset is needed. Position calculation can be conducted, for example, by a positioning server, such as the Enhanced Serving Mobile Location Centre (E-SMLC) in LTE, or by the UE. The former approach is known as the UE-assisted positioning mode, while the latter is referred to as the UE-based positioning mode.

To enable positioning in LTE and to facilitate positioning measurements of a proper quality and for a sufficient number of distinct locations, new physical signals dedicated for positioning have been introduced in the LTE standards. These new physical signals are known as positioning reference signals (PRS). In addition, low-interference positioning subframes have been specified in 3GPP.

PRS are transmitted from one antenna port of an LTE eNodeB according to a pre-defined pattern. A frequency shift, which is a function of the physical cell identifier (PCI), can be applied to the specified PRS patterns to generate orthogonal patterns. These techniques result an effective frequency reuse of six, which makes it possible to significantly reduce neighbor cell interference on the measured PRS and to thus improve positioning measurements.

Although PRS have been specifically designed for positioning measurements and in general are characterized by better signal quality than other reference signals, the current standards do not mandate using PRS for downlink positioning measurements. Other reference signals, e.g. cell-specific reference signals (CRS) also could be used for positioning measurements, in principle.

Because PRS signals from multiple distinct locations need to be measured for OTDOA positioning, the UE receiver may have to deal with PRS that are much weaker than those received from the serving cell. Without approximate knowledge of when the measured signals are expected to arrive in time and what is the exact PRS pattern, the UE would need to perform a signal search across a large window, which would impact the time and accuracy of the measurements as well as the UE complexity. To facilitate UE measurements, the network thus transmits assistance data to the UE. This assistance data includes, among other things, a neighbor cell list with PC's, the number of consecutive downlink subframes containing PRS, the PRS transmission bandwidth, etc.

OTDOA Measurement Quality

To facilitate position calculation and an estimation of the quality of the calculated position, some quality metric for the positioning measurements themselves is necessary. This estimated quality is delivered to the network element that uses the positioning measurements, i.e., a positioning node in the network in the case of UE-assisted positioning, or the mobile terminal in the case of UE-based positioning.

Using the standard deviation of several measurements as a measurement quality metric is one common approach in the research literature. This approach has also been standardized for other systems, e.g., for positioning measurements in Universal Terrestrial Radio Access (UTRA) systems. However, in practice this approach has some practical issues, such as an insufficient number of samples to achieve a reliable statistical confidence level. Further, this approach does not allow a system to distinguish poor measurement performance that is due to poor UE receiver implementation from poor measurement performance arising from difficult radio environment conditions.

In International Patent Application Publication WO/2011/105946, published 1 Sep. 2011, a mapping-based approach is described. This approach exploits the relation between a timing measurement, channel characteristics, and a quality metric. The mapping may be in the measuring node (e.g., a UE) or in a network node (e.g., E-SMLC). Another proposal has been to use not an absolute but a relative metric, which is in some respects similar to a method used for testing Channel Quality Indicator (CQI) reporting. With this approach, for a given (i.e., fixed) condition a reported median value is determined, and then it is determined whether a sufficient number of reports fall within a predetermined range. The disadvantage of this approach is that this technique determines only how stable the reported measurements are, but does not indicate the measurements' absolute quality. In particular, the median value for the measurement may be poor, due to poor UE receiver implementation. This problem cannot be detected with this relative metric.

As noted above, the 3GPP specifications for UTRA specify that a UE performing OTDOA measurements must report a positioning quality metric, which is based on the standard deviation of the OTDOA measurements made by the device. In contrast, current specifications for the Enhanced Universal Terrestrial Radio Access Network (E-UTRAN), otherwise known as the LTE network, specify a reporting mapping similar to that used for UTRA, including a "referenceQuality" information element for the reference signal, a "rstd-Quality" information element for each neighbor cell, and an "OTDOA-MeasQuality" information element for each reported measurement, but do not yet specify a specific approach for determining the quality metric. Table 1 below reproduces the field descriptions applicable to the "OTDOA-MeasQuality" information element, as specified in "Evolved Universal Terrestrial Radio Access (E-UTRA); LTE Positioning Protocol (LPP), Release 10," 3GPP TS 36.355, v. 10.4.0 (December 2012).

TABLE 1

UE positioning OTDOA quality in E-UTRA
OTDOA-MeasQuality field descriptions error-Resolution
This field specifies the resolution R used in error-Value field.
The encoding on two bits is as follows:
'00'  5 meters
'01'  10 meters
'10'  20 meters
'11'  30 meters.
error-Value
This field specifies the target device's best estimate of the uncertainty
of the OTDOA (or TOA) measurement.
The encoding on five bits is as follows:
'00000'0 to       (R*1-1) meters
'00001' R*1 to    (R*2-1) meters
'00010'R*2 to     (R*3-1) meters
. . .
'11111'         R*31 meters or more;
where R is the resolution defined by error-Resolution field.
E.g., R = 20 m corresponds to 0-19 m, 20-39 m, . . . , 620+ m.
error-NumSamples
If the error-Value field provides the sample uncertainty of the OTDOA
(or TOA) measurement, this field specifies how many measurements
have been used by the target device to determine this (i.e., sample size).
Following 3 bit encoding is used:
'000' Not the baseline metric
'001' 5-9
'010' 10-14
'011' 15-24
'100' 25-34
'101' 35-44
'110' 45-54
'111' 55 or more.

In case of the value '000', the error-Value field contains the target device's best estimate of the uncertainty of the OTDOA (or TOA) measurement not based on the baseline metric. E.g., other measurements such as signal-to-noise-ratio or signal strength can be utilized to estimate the error-Value.
If this field is absent, the value of this field is '000'.

Positioning Architecture

In 3GPP, location-based services are known as Location Services (LCS). Three key network elements in an LTE positioning architecture are the LCS Client, the LCS target and the LCS Server. The LCS Server is a physical or logical entity that manages positioning for a LCS target device by collecting measurements and other location information, assists the target device in measurements when necessary, and estimating the LCS target location. A LCS Client is a software-based and/or hardware entity that interacts with a LCS Server for the purpose of obtaining location information for one or more LCS targets, i.e., the entities being positioned. LCS Clients may reside in a network node, an external node (i.e., a network external to a cellular network), a Public Safety Access Point (PSAP), a user equipment (or "UE," 3GPP terminology for an end-user wireless station), a radio base station, etc. In some cases, the LCS Client may reside in the LCS target itself. An LCS Client (e.g., an external LCS Client) sends a request to LCS Server (e.g., a positioning node) to obtain location information. The LCS Server processes and services the received requests and sends the positioning result (sometimes including a velocity estimate) to the LCS Client.

In some cases, the position calculation is conducted by a positioning server, such as an Enhanced Serving Mobile Location Center (E-SMLC) or a Secure User-Plane Location (SUPL) Location Platform (SLP) in LTE. In other cases, the position calculation is carried out by the UE. The latter approach is known as the UE-based positioning mode, while the former approach includes both network-based positioning, i.e., position calculation in a network node based on measurements collected from network nodes such as LMUs or eNodeBs, and UE-assisted positioning, where the position calculation in the positioning network node is based on measurements received from UE.

LTE Positioning Protocol (LPP) is a positioning protocol for control plane signaling between a UE and an E-SMLC, which is used by the E-SMLC to provide assistance data to the UE and by the UE for reporting measurements to the E-SMLC. LPP has been designed in such a way that it can also be utilized outside the control plane domain such as in the user plane in the context of SUPL. LPP is used for DL positioning.

LTE Positioning Protocol Annex (LPPa), sometimes referred to as LTE Positioning Protocol A, is a protocol between the eNodeB and the E-SMLC, and is specified only for control-plane positioning procedures, although it still can assist user-plane positioning by querying eNodeBs for information (e.g., PRS configuration in a cell for OTDOA or UE SRS configuration for UTDOA) and/or eNodeB measurements. LPPa may be used for DL positioning and UL positioning.

FIG. 1 illustrates the UTDOA architecture currently under discussion in 3GPP, including nodes found in the Radio Access Network (RAN) and the core network, as well as an external LCS Client. Although uplink (UL) measurements may in principle be performed by any radio network node, such as the illustrated LTE eNodeB 110, the UL positioning architecture also includes specific UL measurement units, known as Location Measurement Units (LMUs), which are logical and/or physical nodes that measure signals transmitted by a target UE, such as the UE 130 illustrated in FIG. 1. Several LMU deployment options are possible. For example, referring to FIG. 1, LMU 120a is integrated into eNodeB 110, while LMU 120b shares some equipment, e.g., at least antennas, with eNodeB 110. LMU 120c, on the other hand, is a standalone physical node comprising its own radio components and antenna(s).

While the UTDOA architecture is not finalized, there will likely be communication protocols established for communications between a LMU and positioning node, and there may be some enhancements to support UL positioning added to the existing LPPa or to similar protocols.

In particular, a new interface between the E-SMLC and LMU is being standardized for uplink positioning. This interface, known as SLm, is terminated between a positioning server, e.g., the E-SMLC 140 pictured in FIG. 1, and an LMU. It is used to transport messages according to the SLmAP protocol, a new protocol being specified for UL positioning, between the E-SMLC and the LMU. SLmAP can be used to provide assistance data to an LMU, as discussed in further detail below. This protocol may also be used by the LMU to report to the E-SMLC results of measurements on radio signals performed by the LMU. The SLmAP protocol was previously referred to as the LMUp protocol; thus it should be understood that references herein to SLmAP are referring to a developing protocol referred to as LMUp elsewhere.

In LTE, UTDOA measurements, known as UL relative time-of-arrival (RTOA) measurements, are performed on Sounding Reference Signals (SRS). To detect an SRS signal, an LMU 120 needs a number of SRS parameters to generate an SRS sequence that is correlated against the received signal. These parameters are not necessarily known to LMU 120. Thus, to allow the LMU to generate the SRS sequence and detect the SRS signals transmitted by a UE, SRS parameters must be provided in the assistance data transmitted by the positioning node to LMU; these assistance data would be provided via SLmAP. However, the SRS parameters are also generally unknown to the positioning node, which therefore must obtain this information from the eNodeB that configured the target UE to perform the SRS transmissions to be measured by the LMU; this information would have to be provided to the positioning node via LPPa or a similar protocol. Table 2 illustrates examples of parameters that might be signaled from an eNodeB to E-SMLC, using LPPa, for example.

The specific contents of the assistance data provided to LMUs by a positioning node, over SLmAP, are currently being discussed in 3GPP. One intention of the assistance data is to indicate the SRS configuration for the uplink signals that the LMUs will measure. One example of the specific assistance data that might be provided to an LMU by a positioning node, using SLmAP, is shown in Table 3. This assistance data, which can be based on information provided to the E-SMLC by an eNodeB, can be used by the LMU to configure UL RTOA measurements, for example.

TABLE 2

Parameters that may be signaled from eNodeB to E-SMLC, e.g., over LPPa

| Parameter Category | Parameters |
|---|---|
| General | PCI of PCell[Note 1]<br>UL-EARFCN of PCell<br>Timing advance measurement for the UE in PCell [36.214][Note 3] |
| SRS | For each serving cell in which SRS is configured[Note 2]:<br>PCI<br>UL-EARFCN<br>duplex mode<br>UL cyclic prefix<br>UL system bandwidth of the cell<br>Cell-specific SRS bandwidth configuration<br>srs-BandwidthConfig [36.211]<br>UE-specific SRS bandwidth configuration<br>srs-Bandwidth [36.211]<br>number of antenna ports for SRS transmission<br>srs-AntennaPort [36.211]<br>frequency domain position [36.211]<br>SRS frequency hopping bandwidth configuration [36.211]<br>SRS-Cyclic shift [36.211]<br>Transmission comb [36.211]<br>SRS configuration index [36.213]<br>MaxUpPt, used for TDD only [36.211]<br>Group-hopping-enabled [36.211]<br>deltaSS, parameter $\Delta_{ss}$ [36.211, 5.5.1.3], included when SRS sequence hopping is used [36.211, 5.5.1.4] and not included otherwise |

[Note 1] Indicating PCell should not imply configuring SRS on the PCell
[Note 2] Multiple serving cells are possible for a UE configured with CA
[Note 3] Used for search window calculation

TABLE 3

Parameters that may be signaled from E-SMLC to LMU, e.g., over SLmAP

| Parameter Category | Parameters |
|---|---|
| General | Search window parameters[Note 2]:<br>expected propagation delay, T, corresponding to distance between LMU and PCell,<br>delay uncertainty $\Delta$ |
| SRS | For each serving cell in which SRS is configured and to be measured by LMU[Note 1]:<br>PCI<br>UL-EARFCN<br>duplex mode<br>UL cyclic prefix<br>UL system bandwidth of the cell |

TABLE 3-continued

Parameters that may be signaled from E-SMLC to LMU,
e.g., over SLmAP

| Parameter Category | Parameters |
|---|---|
| | Cell-specific SRS bandwidth configuration srs-BandwidthConfig [36.211] |
| | UE-specific SRS bandwidth configuration srs-Bandwidth [36.211] |
| | number of antenna ports for SRS transmission srs-AntennaPort [36.211] |
| | frequency domain position [36.211] |
| | SRS frequency hopping bandwidth configuration [36.211] |
| | SRS-Cyclic shift [36.211] |
| | Transmission comb [36.211] |
| | SRS configuration index [36.213] |
| | MaxUpPt, used for TDD only [36.211] |
| | Group-hopping-enabled [36.211] |
| | deltaSS, parameter $\Delta_{ss}$ [36.211, 5.5.1.3], included when SRS sequence hopping is used [36.211, 5.5.1.4] and not included otherwise |

Note [1] Multiple serving cells are possible for a UE configured with CA; SRS may be not transmitted on all
Note [2] Search window is calculated by the LMU as $[T - \Delta, T + \Delta]$, where $\Delta$ may be e.g. the timing advance measurement provided by eNodeB Since the eNodeB is configuring UE transmissions in general, including the SRS transmissions, it has to communicate to the positioning node the configuration information for the UL transmissions to be measured for UL positioning. It has been proposed that the same configuration information signaled to LMUs by the positioning node is proposed to be also signaled from the eNodeB to the E-SMLC.

Measurements for UL positioning and UTDOA are performed on UL transmissions, which may include, for example, reference signal transmissions or data channel transmissions. UL RTOA is the currently standardized UTDOA timing measurement, and may be performed on Sounding Reference Signals (SRS). The results of the measurements are signaled by the measuring node (e.g., LMU) to the positioning node (e.g., E-SMLC), e.g., over SLmAP.

FIG. 2 illustrates the current architecture under discussion in 3GPP for downlink (DL) positioning, again including nodes found in the Radio Access Network (RAN) and the core network, as well as an external LCS Client. It will be appreciated that this architecture includes many of the same components found in the UL positioning architecture illustrated in FIG. 1. Two additional components shown in FIG. 2, however, are the Serving Gateway (S-GW) and the Packet Data Network Gateway (PDN GW, or P-GW). These gateways terminate the UE's interfaces towards the E-UTRAN network and the Packet Data Network (PDN), respectively.

As noted above, in the current standards for OTDOA positioning, RSTD measurement quality reporting for a neighbor cell is mandated, but no method is specified. This leads to several problems. First, not all wireless devices may report a reliable quality metric for RSTD measurements. Second, different algorithms for estimating the RSTD quality in different UEs may lead to reporting different values even in the same radio environment, same radio signal quality, and even with the similar receiver capabilities. Unreliable RSTD measurement quality will negatively impact the accuracy of the calculated position. More generally, terminal-based quality reporting is subject to channel variations in time. As a result, reported quality may not be precise, depending on the prevailing channel conditions. Again, this may have a significant impact of the accuracy of calculated position. Accordingly, improved techniques for assessing and reporting measurement qualities for downlink positioning measurements are needed.

SUMMARY

Positioning measurement quality reported by a measuring node (e.g., terminal or LMU or eNodeB) may be not reliable, e.g., due to its limited resource for observation, which may have a significant impact on the accuracy of calculated UE location. As described in further detail below, embodiments of the present invention thus include methods to determine a multipath profile corresponding to positioning measurements without dependency on the quality metric reported by a measuring node (e.g., wireless device or LMU), based on the residual deviation between a timing measurement and a high-accuracy location result.

In several embodiments, the calculation of an estimated multipath profile is based on reported timing measurements received from multiple measuring nodes of the same or different types (e.g., wireless devices, eNodeBs, LMUs, etc.), corresponding location fixes based on timing measurements or corresponding high-accuracy location fixes, or both, and reference antenna locations (e.g., transmit antenna locations for downlink measurements or receive antenna locations for UL measurements, eNodeB location, LMU location, etc.).

Some embodiments of the present invention are directed to methods for determining location-specific measurement quality based on historical timing measurements. For example, in some of these embodiments, a location-specific measurement quality is estimated, based on the estimated multipath profile or statistical characteristics of timing measurements. For subsequent positioning estimations, this quality estimate is applied to deduce the uncertainty and confidence of a position estimate.

An example method according to several embodiments of the present invention, implemented in a first node in a wireless communications network, begins with collecting a plurality of timing measurements or ranging measurements, or both, each measurement corresponding to at least one anchor node antenna having a known location. For example, these measurements can be time-of-arrival measurements, performed on transmissions from a single anchor node, or time-difference-of-arrival measurements, performed on transmissions from two anchor nodes. The measurements may be collected by the node in different ways, e.g., measured by the node itself, and/or received from one or more other nodes, and/or retrieved from a database. In one example, the database may comprise an AECID database. Measurements may be obtained during a real network operation, during the network training phase, and/or with drive tests.

The method continues with determining a measurement deviation for each measurement by comparing the measurement to a corresponding reference location. These measurement deviations are then used for one or more of estimating measurement quality for one or more subsequent positioning measurements, estimating uncertainty associated with one or more subsequent positioning estimates, and estimating an effect of multipath on one or more subsequent positioning measurements or estimates.

In some embodiments, using (530) the measurement deviations comprises sending one or more of the measurement deviations to a second node for use by the second node for one or more of estimating measurement quality for one or more subsequent positioning measurements, estimating uncertainty associated with one or more subsequent positioning estimates, and estimating an effect of multipath on one or more subsequent positioning measurements or estimates. In some embodiments, measurement deviations are aggregated separately for each of two or more areas of interest before further processing or before sending them to another node.

In several embodiments, a covariance matrix is calculated from the measurement deviations, such that each row and column in the covariance matrix corresponds to one of the anchor node antennas. The covariance matrix may be sent to another node, in some embodiments, or used by the same node in which it was calculated. In some embodiments, all or a portion of the covariance matrix is used to determine statistical information or multipath effects for measurements corresponding to a particular one of the anchor node antennas. In some cases, this includes calculating measurement variances associated with each diagonal element of the covariance matrix, based on an assumption that the measurement deviations are mean-zero distributed and further based on an assumption that the measurement variance associated with a particular one of the diagonal elements of the covariance matrix is zero. In some embodiments, the node first selects this particular one of the diagonal elements, based on determining that it corresponds to an anchor node antenna having a line-of-sight to an area from which the measurements are collected.

In several embodiments, the method further includes calculating a positioning location based on the covariance matrix discussed above. In some cases, this calculation of the positioning location is based on one or more nonlinear estimation algorithms, such as an extended Kalman filtering algorithm, an unscented Kalman filtering algorithm, a particle filtering algorithm, and a Maximum Likelihood estimation.

Several embodiments include determining an estimated measurement quality for a positioning measurement, based on the measurement deviations. In some cases, this may include using aggregated measurement deviations for a particular area of interest to determine measurement quality for a positioning measurement corresponding to the area of interest. In some cases, the node performing the estimation may first determine whether the measurement deviations include at least a threshold number of measurement deviations before using the measurement deviations to determine the estimated measurement quality. In some embodiments, determining the estimated measurement quality comprises weighting one or more of the measurement deviations based on a measurement age, before using the aggregating measurement deviations to determine the estimated measurement quality.

An estimated measurement quality computed according to any of these techniques may be used for any of several purposes. For example, a positioning measurement can be omitted from a positioning calculation, based on a comparison of the estimated measurement quality to a threshold. A positioning method can be selected, based on the estimated measurement quality. A measurement request can be configured, based on the estimated measurement quality. The estimated measurement quality can be compared to a reported measurement quality received from a measuring node, to verify the reported measurement quality. The estimated measurement quality may be used to weight the positioning measurement in a position calculation. Two or more of these uses can be combined, in various embodiments.

In some embodiments of the present invention, the measurement deviations and/or a corresponding covariance are calculated in one node and sent to another for their use. Thus, another example method according to several embodiments of the present invention, implemented in a second node, begins with receiving measurement deviations from a first node, where the measurement deviations correspond to a plurality of timing measurements or ranging measurements, or both, and where each measurement deviation corresponds to at least one anchor node antenna having a known location. The received measurement deviations are then used by the second node for one or more of estimating measurement quality for one or more subsequent positioning measurements, estimating uncertainty associated with one or more subsequent positioning estimates, and estimating an effect of multipath on one or more subsequent positioning measurements or estimates. Any of the uses and variations summarized above are applicable to this second node, as well.

Network node apparatus adapted to carry out several of the techniques summarized above, and variants thereof, are also disclosed in the detailed discussion that follows. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Figure 1:
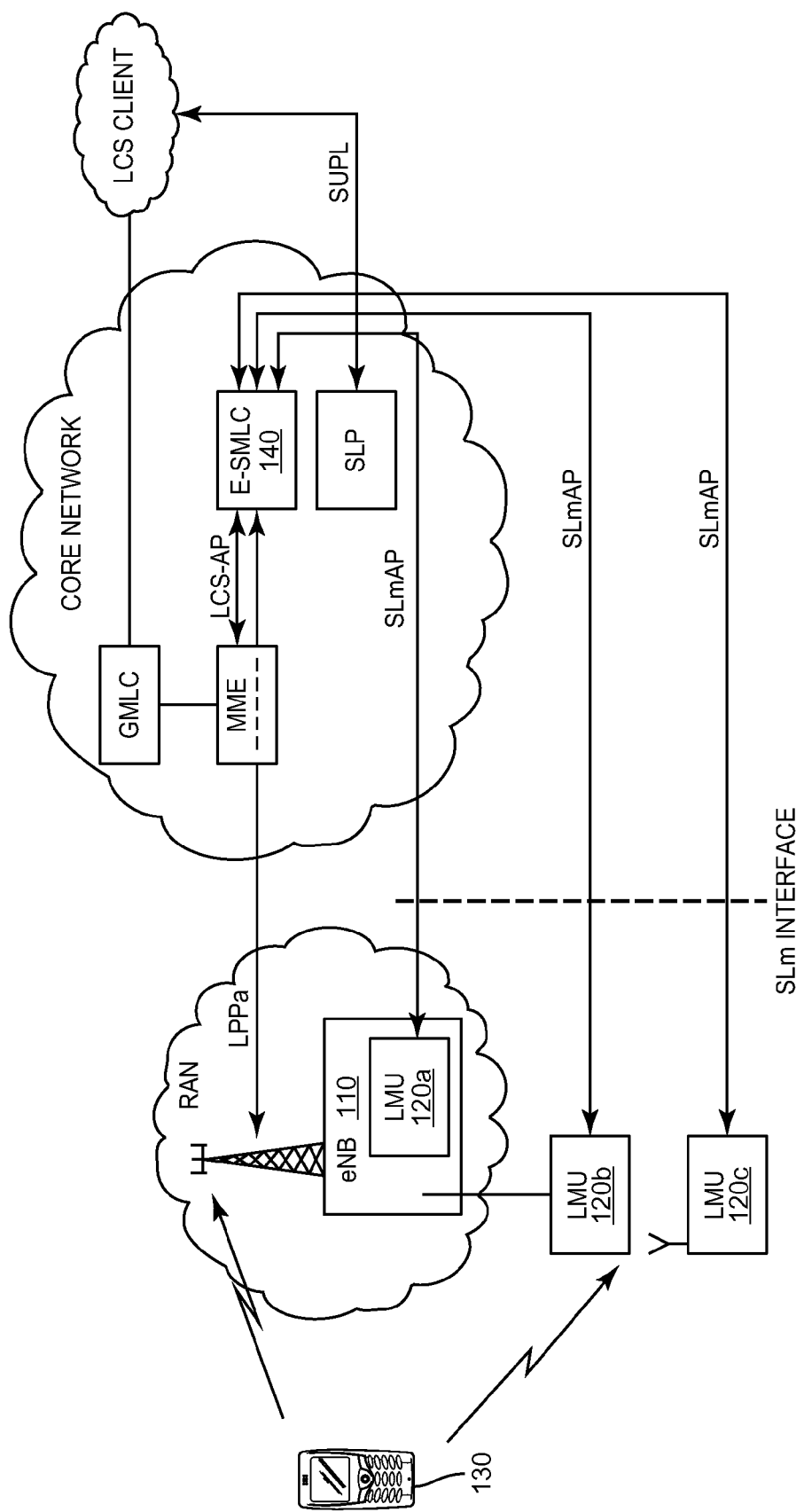
FIG. 1 illustrates several nodes in an example network configured according to the LTE positioning architecture.

While terminology from 3GPP LTE is used in this disclosure to exemplify the invention, this should not be seen as limiting the scope of the invention to LTE systems or systems using the LTE Radio Access Technology (RAT). Other wireless systems, including those based on WCDMA, WiMAX, UMB and GSM, may also benefit from exploiting the ideas covered within this disclosure. Furthermore, the inventive techniques disclosed herein are not limited to single-RAT systems, but may also be applied in the multi-RAT context. Some other RAT examples are LTE-Advanced, UMTS, HSPA, GSM, cdma2000, WiMAX, and WiFi.

Still further, the techniques and apparatus described herein may be considered as standalone embodiments or may be used in any combination with each other, unless their descriptions herein clearly indicate otherwise.

The terms "wireless device" and "UE" are used interchangeably in the description that follows. A UE may comprise any device equipped with a radio interface and capable of at least generating and transmitting a radio signal to a radio network node. Note that some radio network nodes, e.g., a femto base station, or "home base station," and LMUs, may be equipped with a UE-like interface, and in some cases may need to be positioned in the same manner as UEs are positioned. Examples of UEs that are to be understood in a general sense are wireless PDAs, wireless-equipped laptop computers, mobile telephones, wireless sensors, fixed relay nodes, mobile relay nodes, and any radio network node equipped with a UE-like interface (e.g., small RBS, eNodeB, femto BS).

A "radio node" is characterized by its ability to transmit and/or receive radio signals, and comprises at least a transmitting or receiving antenna. A radio node may be a UE or a radio network node. Some examples of radio nodes are a radio base station (e.g., eNodeB in LTE or NodeB in UTRAN), a relay, a mobile relay, a remote radio unit (RRU), a remote radio head (RRH), a wireless sensor, a beacon device, a measurement unit capable of transmitting downlink signals (e.g., LMUs), a user terminal, a wireless PDA, a mobile telephone, a smartphone, a wireless-equipped laptop, etc.

A "radio network node" is a radio node in a radio communications network and is typically characterized by having its own network address. For example, a mobile device in a cellular network may have no network address, but a wireless device involved in an ad hoc network is likely to have a network address. A radio node may be capable of operating or receiving radio signals or transmitting radio signals in one or more frequencies, and may operate in single-RAT, multi-RAT or multi-standard mode (for example, a dual-mode user equipment may operate with any one or combination of WiFi and LTE or HSPA and LTE/LTE-A). A radio network node, including eNodeB, RRH, RRU, LMU, or transmitting-only/receiving-only nodes, may or may not create own cell. It may also share a cell with another radio node which creates own cell. More than one cell may be associated with one radio node. Further, one or more serving cells (in DL and/or UL) may be configured for a UE, e.g., in a carrier aggregation system where a UE may have one Primary Cell (PCell) and one or more Secondary Cells (SCells). A cell may also be a virtual cell, e.g., characterized by a cell ID but not providing a full cell-like service, associated with a transmit node.

A "network node" may be a radio network node or a core network node. Some non-limiting examples of a network node are an eNodeB, a Radio Network Controller (RNC), a positioning node, an MME, a PSAP, a SON node, an MDT node, and an O&M node. A "coordinating node," as described below may be but is not necessarily a network node.

A "positioning node" as described in several embodiments herein is a node that has positioning functionality. For example, for LTE it may be understood as a positioning platform in the user plane (e.g., SLP in LTE) or a positioning node in the control plane (e.g., E-SMLC in LTE). An SLP may also consist of a SUPL Location Center (SLC) and a SUPL Positioning Center (SPC), where the SPC may also have a proprietary interface with E-SMLC. Positioning functionality may also be split among two or more nodes. For example, there may be a gateway node between LMUs and E-SMLC, where the gateway node may be a radio base station or another network node; in this case, the term "positioning node" may relate to E-SMLC and the gateway node. In a testing environment, a positioning node may be simulated or emulated by test equipment.

The term "coordinating node" as used herein is a network and/or node that coordinates radio resources with one or more radio nodes. Examples of a coordinating node are a network monitoring and configuration node, an OSS node, an O&M node, an MDT node, a SON node, a positioning node, an MME, a gateway node such as Packet Data Network Gateway (P-GW) or Serving Gateway (S-GW) network node or femto gateway node, a macro node coordinating smaller radio nodes associated with it, an eNodeB coordinating resources with other eNodeBs, etc.

A "configuring node" as described in at least some embodiments herein is a radio network node that configures UL transmissions for a UE, typically the serving cell (or PCell) node. A "measuring node" (sometimes referred to as an "assisting radio node") as described in at least some embodiments herein is a radio network node that performs UL measurements on the configured UL transmissions for the UE. Note that a configuring node may also be a measuring node.

The signaling described below in connection with various embodiments of the invention is either via direct links or logical links (e.g., via higher layer protocols and/or via one or more network and/or radio nodes). For example, signaling from a coordinating node may pass through another network node, e.g., a radio network node.

The term "subframe" as used in the description herein (typically related to LTE) is an example resource in the time domain, and in general it may be any pre-defined time instance or time period.

The technical embodiments described herein relate to timing radio measurements, sometimes referred to as ranging measurements, which may be any one or more of: measurements performed in downlink (DL), measurements performed in uplink (UL), or measurements performed with respect to one or more of other radio nodes (e.g., with device-device communication or in a radio ad hoc network). Some examples of such timing measurements are Time-Difference-of-Arrival (TDOA) measurements, Time-of-Arrival (TOA) measurements, Reference-Signal-Time-Difference (RSTD) measurements, UL Relative Time-of-Arrival (RTOA) measurements, Round Trip Time (RTT) measurements, UE receive-transmit (Rx-Tx) time difference measurements, and eNodeB Rx-Tx time difference measurements.

Current Problems with Positioning Measurements

As noted above, positioning measurement quality reported by a measuring node (e.g., UE, LMU or eNodeB) may be not reliable, e.g., due to its limited resource for observation, which may have a significant impact on the accuracy of calculated UE location. In the current standards for downlink positioning in LTE, UEs are required to provide quality reporting for the RSTD measurements taken for neighbor cells, but no method for estimating the quality is specified.

As a result, not all wireless devices may report a reliable quality metric for RSTD measurements. Even where UE implementations provide repeatable results, different algorithms for estimating the RSTD quality in different UEs may lead to reporting different values even in the same radio environment, same radio signal quality, and even with the similar receiver capabilities.

Terminal-based quality reporting is also subject to channel variations in time and due to environmental changes. The presence of multipath can cause significant variation in timing measurements, which can in turn affect the measurement quality estimation. As a result, the reported quality at any given time may not be precise. This may have a significant impact of the accuracy of calculated position.

Described below, then, are technical solutions to address one or more of the problems noted above. These technical solutions include methods to determine a multipath profile corresponding to positioning measurements without dependency on the quality metric reported by a measuring node (e.g., wireless device or LMU), based on the residual deviation between a timing measurement and a high-accuracy location result.

In several embodiments, the calculation of an estimated multipath profile is based on reported timing measurements received from multiple measuring nodes (e.g., wireless devices, eNodeBs, LMUs, etc.), corresponding location fixes based on timing measurements or corresponding high-accuracy location fixes, or both, and reference antenna locations (e.g., transmit antenna locations for downlink measurements or receive antenna locations for UL measurements, eNodeB location, LMU location, etc.).

Some embodiments of the present invention are directed to methods for determining location-specific measurement quality based on historical timing measurements. For example, in some of these embodiments, a location-specific measurement quality is estimated, based on the estimated multipath profile or statistical characteristics of timing measurements. For subsequent positioning estimations, this quality estimate is applied to deduce the uncertainty and confidence of a position estimate.

Methods of Estimating Multipath Characteristics

While several of the detailed examples and embodiments described herein involve LTE mobile terminals performing RSTD measurements for OTDOA positioning, it should be understood that the problems described above apply more generally and that the techniques described herein may be applied to timing measurements performed by any radio node. Further, the techniques for estimating multipath characteristics and applying the results may be carried out by any node that can obtain radio measurements at all, whether by performing the measurements or by receiving measurement data from another node, or a combination of both. Still further, while the estimation of multipath characteristics detailed below may be used in calculating locations for a mobile terminal or other wireless device, the estimation of multipath characteristics may in some cases be carried out by a node that is not capable of calculating a location, whether for itself or for another node.

Examples of nodes that can obtain radio measurements and estimate multipath characteristics according to these techniques thus include: measuring nodes, such as wireless devices, eNodeB's, LMUs; and network nodes receiving measurement reports, such as eNodeB's, positioning nodes, Minimization-of-Drive-Time (MDT) nodes, Self-Organizing Network (SON) nodes, and wireless devices receiving measurements from another node). In the discussion that follows, a node performing multipath characterization is referred to as an estimating node.

A positioning calculation based on timing measurements involves solving a system of equations. For example, OTDOA measurements taken by a mobile terminal for signals from three geographically dispersed base stations yield equations for three hyperbolas. Given a motionless mobile terminal and perfect measurements, these three hyperbolas intersect at the mobile terminal's location. Of course, mobile terminals are not motionless, and real measurements are subject to noise, interference, multipath, and other distortions. Accordingly, numerical techniques based on Least Mean Square criterion or weighted Least Mean Square methods are typically used to calculate a position estimate.

Figure 3:
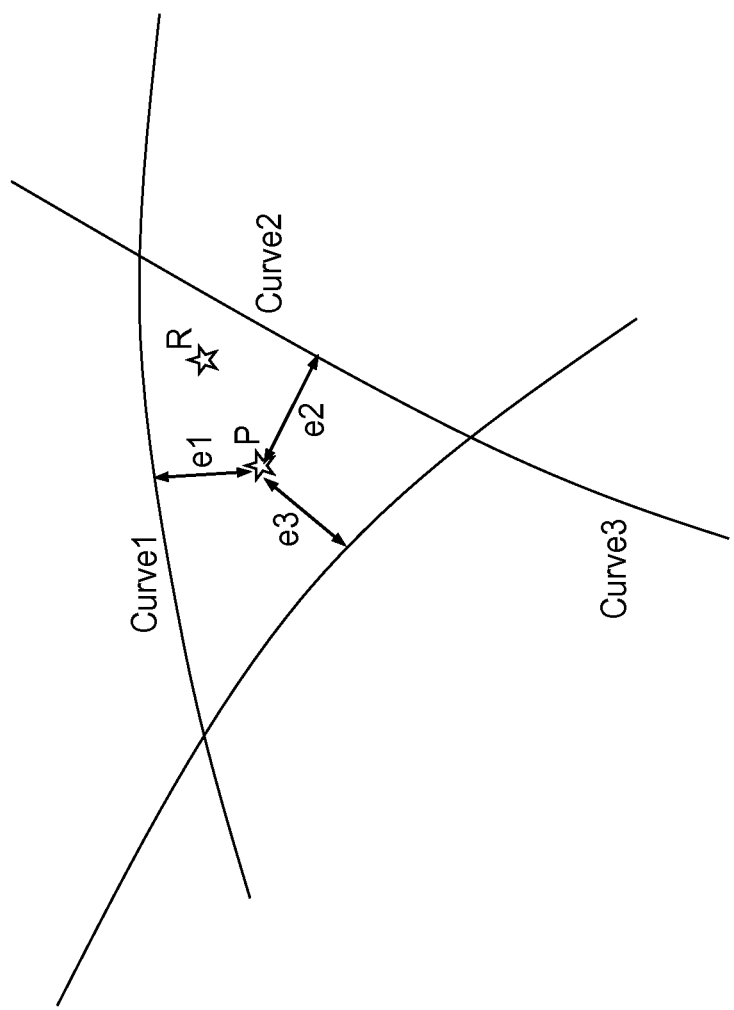
FIG. 3 illustrates the relationships between curves derived from positioning measurements, residual errors, and measurement deviations.

An example is illustrated in FIG. 3, which illustrates curves 1, 2, and 3, which are derived from time-difference-of-arrival (TDOA) measurements of signals from three base stations, given known locations for those base stations. An estimate of the mobile terminal's position is calculated, based on these curves, and is denoted as point P.

Residual errors can then be found as the distances between point P and the curves—these residual errors are represented by vectors e1, e2, and e3 in FIG. 3. Each residual error may characterize the uncertainty of one or more measurements. Thus, a large distance from the estimated location point to the curve corresponding to one TDOA measurement may indicate a potentially large error in this TDOA measurement. Further, an averaged residual error or even the maximum over all residual errors may indicate the consistency of all measurements and can be used as an indicator for location uncertainty. Note that the residual errors may be represented in units of either time or distance.

Since there always an error in location estimate, however, the true location of the mobile terminal, represented as point R in FIG. 3, may be different than the estimated location (point P). In some cases, a high-accuracy location may be known, e.g., from another positioning method, such as GPS. Given a high-accuracy or "true" location R for the positioned device, a "measurement deviation" for each timing measurement can be defined as the distance between R and the curve corresponding to that measurement. This measurement deviation indicates the magnitude of the error introduced by each measurement. Like the residual error, the measurement deviation may also be represented in units of time or distance. In practice, point R may be obtained as a high-accuracy positioning result, e.g., GNSS, OTDOA, UTDOA, or any hybrid positioning method, which may in some cases be reported together with the timing measurements.

The factors that may impact the amount of the residual error and the measurement deviation may include, but are not limited to: multipath effects; imprecise radio receive and/or transmit timing; and noise and interference during measurement. Since measurement deviation is based on a true or high-accuracy location, it can reflect the fluctuation of the timing measurements directly.

An estimating node that has access to high-accuracy location information and corresponding timing or range measurements can collect multiple measurement deviations from positioning attempts and associate each measurement deviation with an area of interest. These measurement deviations thus characterize, at least partly, the radio environment in the areas of interest, e.g., with respect to multipath and interference.

Any of several techniques may be used to describe and determine areas of interest. For instance, each area may correspond to an identification configured in the network, such as a Cell ID, a Local Area Code (LAC), a tracking area ID, a Multicast-Broadcast Single-Frequency Network (MB-SFN) area ID, or a synchronization area ID, to name a few examples. Note that the serving cell ID or the tracking area may be known when a measurement request is sent. Some other technology or knowledge may be used to define the areas of interest. For example, areas may be associated with one or more previously calculated positioning results and/or previously performed positioning measurements and/or fingerprints. For instance, a polygon or ellipse corresponding to an AECID positioning result, an arc or ellipse corresponding to a RTT measurement, or an ellipse corresponding to a TOA/TDOA positioning result, may all be used to determine an area of interest. An area of interest might also be determined by a cell ID and a timing advance measurement within a range, which would typically correspond to an arc in a sector corresponding to the cell.

Figure 4:
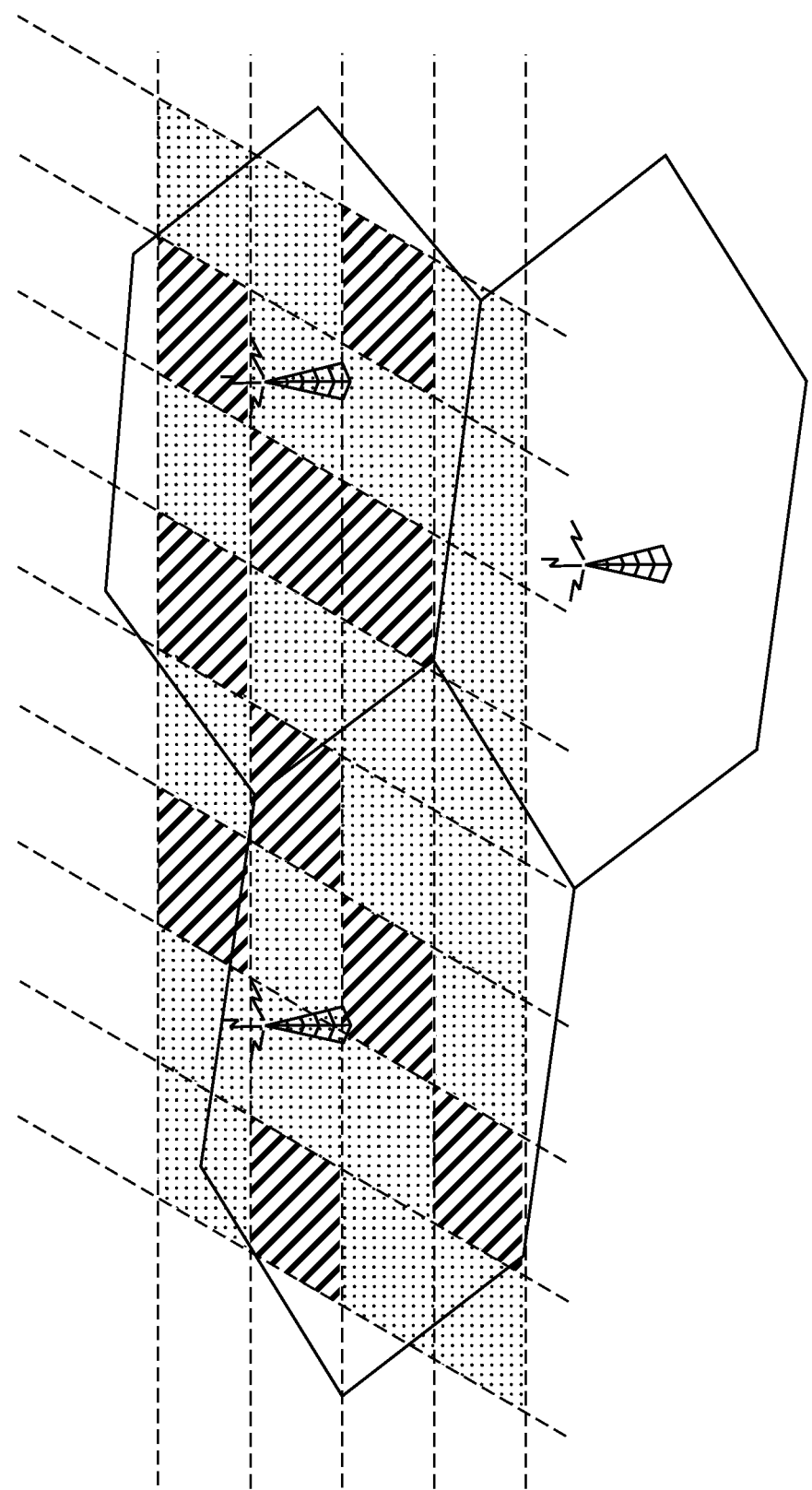
FIG. 4 illustrates how statistical characteristics may be distributed across a geographical area.

Another way to determine an area of interest is by clustering high-accuracy positioning results. The geographical shape of a cluster, after applying an appropriate clustering algorithm, can be used as an area of interest. Yet another technique is to use automatically or manually preconfigured areas, e.g., a set of overlapping or non-overlapping shapes such as polygons, triangles, squares, rectangles, etc. or a set of environments associated with areas (e.g. indoor areas or outdoor areas). This may be a result of triangulation (e.g., Delaunay triangulation, Voronoi tessellation), applying square or rectangle grids over a larger area, or using a map of environments (e.g. streets and buildings). FIG. 4 illustrates one example of such an approach, where a rectangular grid is overlaid on the cellular coverage area.

For a given area of interest, the estimating node may aggregate measurement deviations for measurements that correspond to known high-accuracy positions. For a two-dimensional example with three curves, e.g., as illustrated in FIG. 3, the aggregated measurement errors may be represented as follows:

$$\text{Error} = \begin{bmatrix} e(1,1), e(1,2), e(1,3), \ldots, e(1,N) \\ e(2,1), e(2,2), e(2,3), \ldots, e(2,N) \\ e(3,1), e(3,2), e(3,3), \ldots, e(3,N) \end{bmatrix} = \begin{bmatrix} [e(1,i)] \\ [e(2,i)] \\ [e(3,i)] \end{bmatrix}, \quad (1)$$

i.e.:

$$\text{Error}=[e(k,i)] i \in [1,N], k \in [1,3],$$

where:

$$e(k,i)=T\_\text{true}(k,i)-T(k,i) i \in [2,N].$$

T_true(k,i) is the expected timing measurement at the measurement node based on a corresponding high-accuracy reference location, and T(k,i) is a reported timing measurement for neighbor cell k and measurement instance i. For TDOA measurements, T(k,i)=t(k,i)−t(0,i), where t(k,i) and t(0,i) are timings measured by the measurement node for neighbor cell k and a reference cell (denoted as cell 0). In Equation (1), N is the number of separate positioning attempts, where each attempt is measuring the same three neighbors. In effect, then, N is the number of independent equations provided by the positioning attempts.

For a given area of interest, based on measurement errors, a covariance matrix Q can be computed:

$$Q = \text{cov}(\text{Error}) = \begin{bmatrix} D11 & D12 & D13 \\ D21 & D22 & D23 \\ D13 & D23 & D33 \end{bmatrix}, \quad (2)$$

where the elements of matrix Q may be calculated based on error elements e(k,i). The details of calculating or estimating a covariance matrix are well known to those familiar with statistics and numerical processing techniques.

Measurement deviation data, such as measurement deviations, measurement deviation statistics, and the like, may be stored and used by the estimating node itself and/or may be signaled to another node. Likewise, the result of measurement deviation processing, such as any statistics based on measurement deviations, an error matrix or at least some of its elements e(k,i), a covariance matrix or at least some of its elements, a multipath profile determined as discussed below, and the like, may be stored and used by the estimating node itself and/or may be signaled to another node.

According to some embodiments, measurement deviation data and/or the result of measurement deviation processing may be stored in a database, in internal or external memory, or in a computer-readable medium. In one example, the database may be an AECID database or a database containing RF fingerprints. In another example, measurement deviation data and/or the result of measurement deviation processing may be stored in association with one or more areas of interest. The relevant measurement deviation and/or the result of measurement deviation processing may subsequently be retrieved from memory or a database for further usage. Thus, for example, a relevant covariance matrix Q associated with an area of interest X may be retrieved for calculation of a positioning result for a wireless device associated with an area of interest X.

Using the Covariance Matrix Q

Two approaches for using covariance matrix Q are further described in more detail. In a first approach, "Approach 1," elements of matrix Q are used to deduce statistical timing information and the effects of multipath on measurements for a given position or area. In a second approach, "Approach 2," the matrix Q or its elements are used in a positioning calculation. It will be appreciated that variations and combinations of these approaches are possible.

Approach 1—With Approach 1, the elements of covariance matrix Q are used to deduce statistical information (e.g., variance) about timing (e.g., relevant cell's timing). This statistical information may then be used, e.g., to estimate the multipath effect.

In one example, the diagonal elements of the covariance matrix Q may be used. For a three curve scenario, as illustrated in FIG. 3, the elements D11, D22, and D33 are used. The elements D11, D22, D33 may be simplified if e(k,i) can be assumed to be mean-zero distributed. In this case, the below equations follow, when T(k,i)=t(k,i)−t(0,i):

$$D11=E[[e(1,i)]*[e(1,i)]^T]=\sigma^2([t(1,i)])+\sigma^2([t(0,i)])-2E[[t(1,i)]*[t(0,i)]^T]$$

$$D22=E[[e(2,i)]*[e(2,i)]^T]=\sigma^2([t(2,i)])+\sigma^2([t(0,i)])-2E[[t(2,i)]*[t(0,i)]^T]$$

$$D33=E[[e(3,i)]*[e(3,i)]^T]=\sigma^2([t(3,i)])+\sigma^2([t(0,i)])-2E[[t(3,i)]*[t(0,i)]^T]$$

Further, if timing variation is uncorrelated between reference and neighbor cells (normally reference cell and neighbor cell are not co-sited, so this assumption is valid), then the following equations follow:

$$D11=E[[e(1,i)]*[e(1,i)]^T]=\sigma^2([t(1,i)])+\sigma^2([t(0,i)]),$$

$$D22=E[[e(2,i)]*[e(2,i)]^T]=\sigma^2([t(2,i)])+\sigma^2([t(0,i)]),$$

$$D33=E[[e(3,i)]*[e(3,i)]^T]=\sigma^2([t(3,i)])+\sigma^2([t(0,i)]),$$

All variance terms in the right-hand side of the equations above are unknowns. This set of equations is underdetermined, and solvable only if one of the unknown terms is known. Hence, one approach is to first determine (or assume) that one cell has a line-of-sight (LOS) path to the mobile terminal, e.g., using a Geographic Information System (GIS). A zero variance for this cell can then be assumed, after which the variances of other cells can be decoupled easily.

In the event that it cannot be assumed that e(k,i) are distributed with zero mean, e.g., when a non-LOS situation exists, the mathematical expectation of [[e(1,i)], [e(2,i)], $[e(3,i)]]^T$ can be used as an estimate of the main non-LOS path delay. In one example, the variance of the multipath delay profile can be characterized as follows:

$$[\sigma^2([t(0,i)]),\sigma^2([t(1,i)]),\sigma^2([t(2,i)]),\sigma^2([t(3,i)])]$$

Approach 2—According to Approach 2, all or part of the covariance matrix Q may be used for positioning calculations, e.g., for later positioning attempts for the wireless device used to collect the measurements use to calculate Q or for other wireless devices. For example, a TOA/TDOA based multilateration algorithm (e.g., a Weighted Least Mean Square algorithm) normally requires a priori knowledge of the statistics for each measurement's deviation and the measurements' cross-correlation properties. Matrix Q may be used for this purpose.

For example, covariance matrix Q or at least some of its elements may be used directly to facilitate the positioning calculation for a target device. This is efficient, because the covariance matrix Q determined according to the techniques described above (e.g., based on measurement deviations) is obtained from a true network environment at true locations or locations obtained with high accuracy, which are close to the target device's location.

Matrix Q is a sufficient statistic measure under Gaussian assumption. However, in a real environment the distribution of timing measurement error may be non-Gaussian. For a better solution, it is therefore worthwhile to have separate processing for each timing measurement deviation sequence e.g., $e(1,i)$, where i is in the range $[1,N]$.

The statistical characteristic, e.g., PDF (Probability Distribution Function), CDF (Cumulative Distribution Function), or CF (Characteristic Function), may be deduced from each measurement deviation sequence. Such PDF/CDF/CF may provide a full picture of the timing characteristic variation. The PDF/CDF/CF may be saved by a positioning node for each cell/geographical area, for example, so that it can be utilized in a positioning algorithm to better determine the location and the uncertainty area or confidence of a location fix. Examples of well-known positioning algorithms that can be used for non-Gaussian cases include: Extended Kalman Filtering; Unscented Kalman Filtering; Particle Filtering or Monte Carlo; and the Maximum Likelihood Method. For example, when Particle Filtering or other Monte Carlo method is used, the uncertainty area and confidence of location fix can be obtained from the statistical distribution of the particles or Monte Carlo experiment samples. To deduce confidence and uncertainty from statistical distribution is typically straightforward to those skilled in the art of statistical analysis and nonlinear analysis. (See, for example: S. J. Julier and J. K. Uhlmann. "Unscented filtering and nonlinear estimation," Proceedings of IEEE, 2004, 92(3):401-422; Craig O. Savage, Robert L. Cramer, Harry A. Schmitt, "TDOA Geolocation with the Unscented Kalman Filter, International Conference on Networking, Sensing and Control—ICNSC, 2006; and H. Chen, P. Deng, Y. Xu, and X. Li, "A robust location algorithm with biased extended Kalman filtering of TDOA data for wireless sensor networks," In Proceedings of International Conference on Wireless Communications, Networking and Mobile Computing 2005, pp. 883-886.)

Obtaining and Using Location-Specific Measurement Error Characteristics

The techniques for estimating a multipath characteristic described above may be used to obtain a location-specific measurement error or measurement quality estimate. For example, elements of the Error matrix given in Equation (1) may be used to predict the quality of a measurement reported by a wireless device in an area of interest. The average or median error among the relevant measurements in the area of interest might be used, for instance.

One technique for obtaining a location-specific measurement quality estimate is as follows. First, for each area of interest, measurements are collected and statistical characteristics of measurement errors are deduced. One example of this was described above, in the determination of the Error matrix of Equation (1). It is possible that some areas do not have a valid statistical characteristic estimate, e.g., because of inadequate measurement collection, insufficient measurement samples, etc. For such areas, a statistical prediction method (e.g., interpolation between neighboring areas or extrapolation from neighboring areas) may be applied to obtain the statistical characteristic. For example, if the shadowed grid areas in FIG. 4 have known characteristics, then characteristics for the unshadowed areas can be deduced via two-dimensional interpolation.

The statistical prediction method may also use weighting based on sample quantity, measurement age, or both, in some cases. Statistical characteristics deduced from a large number of measurements in a specific area have higher reliability, while too few measurements may be insufficient for obtaining a reliable statistical characteristic. Likewise, a statistical characteristic for a given area is more reliable if measurements in that area are relatively new. In some implementations, for example, the maximum acceptable age may be pre-configured, so that measurements with a longer than the maximum acceptable age are assigned a zero weight, while measurements with a shorter but close to the maximum acceptable age may be used with a low weight. There may also be defined an aggregate measurement age of the area, e.g., calculated as average of all relevant measurements in a specific area, where the relevant measurements may be all available measurements or measurements with the age not longer than the maximum acceptable measurement age. The aggregate measurement age of the area may be required to be not larger than a threshold; otherwise a statistical prediction method may be applied.

Upon measurement collection update in a certain area, the statistical characteristic is also updated/re-calculated if one or more conditions are met, in some cases. For example, the statistical characteristic may be updated in some embodiments if the number or percentage of new measurements is greater than a predefined threshold. In other embodiments, the statistical characteristic may be updated if a cell planning change is bigger than a predefined level (e.g., more than X new sites are introduced in the network, the antenna tilt or azimuth configuration in a cell is changed by more than Y degrees, the transmit power of a cell is changed by more than Z dB, etc.).

The measurement uncertainty (or measurement error or measurement quality) obtained according to any of the techniques described above may further be used for one or more of the following, for example:

For signaling to another node, such as:
  from a radio network node (e.g., an LMU or eNodeB) to another network node (e.g., another radio network node, a positioning node, an MDT node, a SON node, an O&M node, etc.)
  from a wireless device to a network node (e.g., positioning node)
  from a wireless device to a radio network node (e.g., eNodeB)
  from a wireless device to another wireless device
  from a positioning node to another network node (e.g., another positioning node, a SLP, an MDT node, a SON node, an O&M node, etc.).
For filtering measurements used for position calculation. For instance, some embodiments may be configured to not use measurements of a certain type for position calculation when the predicted measurement error for the corresponding area of interest is above a threshold.

For positioning method selection and configuring measurement reports. For example, a particular positioning method or methods may be less preferred or may be not used when the predicted measurement error in the area of interest for a measurement used by the positioning method is above a threshold. Similarly, some embodiments may be configured to refrain from requesting a certain type of measurements when the predicted measurement error for this measurement type in the area of interest is above a threshold. This may be implemented as a preference or as an absolute rule, in various embodiments.

For verifying the measurement quality information received from a measuring node. For instance, some embodiments may be configured to trust the measurement quality reported by the wireless device if it is within a pre-defined range of a measurement quality that is predicted based on the techniques described above. Note that the trusted measurement quality reports from wireless device may also be used to populate the database with measurement errors maintained by a node or used for measurement statistics calculation.

For triggering of a network fine-tuning or optimization. For instance, for a major error contributor, it may be worthwhile to check/refine/trigger the update of the timing information of nodes which contribute with large errors.

For positioning calculation. The measurement errors or quality may be used for at least calculating a location for a target device, but may also be used for calculating the corresponding location uncertainty and confidence level. For example, the predicted measurement errors can be used to weight measurements reported by the target device.

Figure 5:
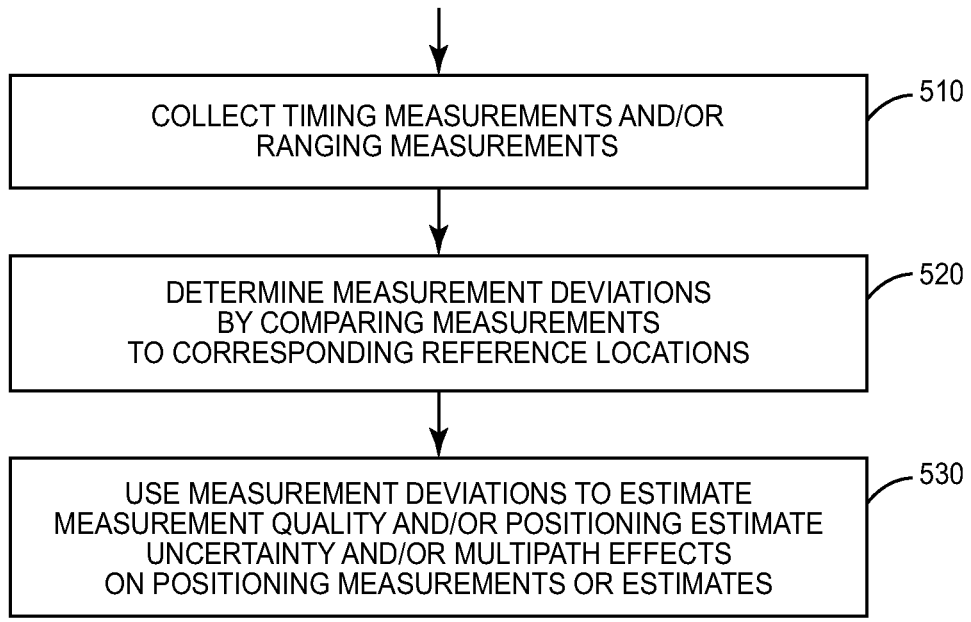
FIGS. 5, 6, and 7 are process flow diagrams illustrating example methods according to various embodiments of the present invention.

In view of the several techniques described above, it will be appreciated that FIG. 5 illustrates, in general terms, an example method for use in positioning, as might be implemented in an estimating node, such as a positioning node in an LTE network. The illustrated method begins, as shown at block 510, with collecting a plurality of timing measurements or ranging measurements, or both, each measurement corresponding to at least one anchor node antenna having a known location. Although these timing measurements may be any of a wide variety of measurements, as discussed above, in some embodiments these measurements might comprise OTDOA measurements, in which case each measurement reflects a time difference between signals received from a reference transmitter and an anchor node of interest. The measurements may be collected by the node in different ways, e.g., measured by the node itself, and/or received from one or more other nodes, and/or retrieved from a database. In one example, the database may comprise an AECID database. Measurements may be obtained during a real network operation, during the network training phase, and/or with drive tests.

The illustrated method continues, as shown at block 520, with determining a measurement deviation for each measurement by comparing the measurement to a corresponding reference location, i.e., a "true" location for the measurement or a measurement location known by other, high-accuracy positioning measurements. This may be done, for example, by computing a measurement error as the difference between the measurement and a timing or range for the reference location. Although not illustrated in FIG. 5, in some embodiments, the method further comprises aggregating measurement deviations separately for each of two or more areas of interest.

Next, as shown at block 530, the illustrated method continues with using the measurement deviations for one or more of: estimating measurement quality for one or more subsequent positioning measurements, estimating uncertainty associated with one or more subsequent positioning estimates, and estimating an effect of multipath on one or more subsequent positioning estimates. Importantly, the ultimate use of the measurements deviations may be in the node that collects the measurements and computes the measurement deviations or in a completely separate node. Accordingly, in some embodiments, the "using operation" illustrated in block 530 comprises sending the measurement deviations to a second node for use by the second node for one or more of estimating measurement quality for one or more subsequent positioning measurements, estimating uncertainty associated with one or more subsequent positioning estimates, and estimating an effect of multipath on one or more subsequent positioning estimates. Note that in some embodiments, the estimated uncertainty of positioning estimates may be further encoded into one of the pre-defined Universal Geographic Area Descriptor (GAD) shapes, e.g., prior to sending the encoded positioning estimate to another node.

Figure 6:
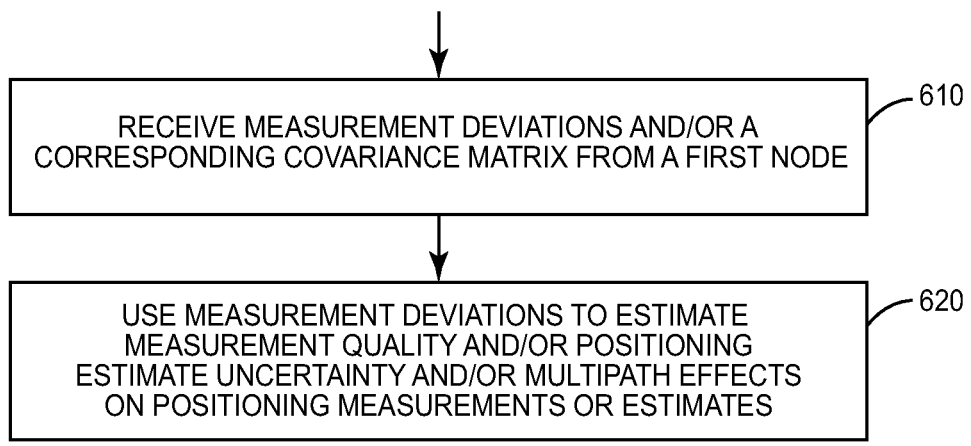

An example method according to this latter approach is illustrated in FIG. 6, which illustrates generally a method performed by a second node. As shown at block 610, this second node receives measurement deviations from a first node, the measurement deviations corresponding to a plurality of timing measurements or ranging measurements, or both, and each measurement deviation corresponding to at least one anchor node antenna having a known location. The measurement deviations may be received by the node from one or more of several different sources, e.g., from a node performing measurements, a node storing measurements, and/or from a database. In one example, the database may comprise an AECID database. Residual deviations may be obtained during a real network operation, during the network training phase, and/or with drive tests.

The received measurement deviations may have aggregated separately for each of two or more areas of interest, in some embodiments. In some embodiments, the second node may also receive a corresponding covariance matrix from the first matrix, each row and column in the covariance matrix corresponding to one of the anchor node antennas. In still other embodiments, the covariance matrix may be received instead of the measurement deviations.

As shown at block 620, the illustrated method for the second node continues with using the received measurement deviations for one or more of estimating measurement quality for one or more subsequent positioning measurements, estimating uncertainty associated with one or more subsequent positioning estimates, and estimating an effect of multipath on one or more subsequent positioning measurements or estimates. Details of several examples of these uses were provided above.

As discussed in some detail above, some embodiments of the invention involve the calculation of a covariance matrix from the measurement deviations, such that each row and column in the covariance matrix corresponds to one of the anchor node antennas. In some cases, this calculation is performed by the same node that collects the measurements and determines the measurement deviations; in some of these embodiments all or part of the covariance matrix is sent to the second node for its use. Regardless of where the covariance matrix is computed, it may be used by either node to determine statistical information or multipath effects for measurements corresponding to a particular one of the anchor node antennas.

Figure 7:
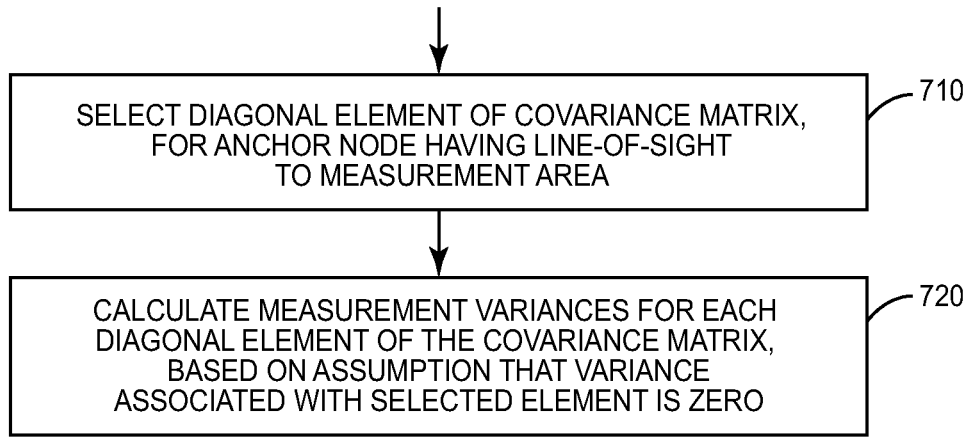

An example of one such use is shown in FIG. 7, which illustrates a method for determining statistical information for measurement information relating to one or more of the anchor node antennas, which method may be performed in either a node that computes the covariance matrix or in a node that receives it from somewhere else. As shown at block 710, the method begins with selecting one of the diagonal elements of the covariance matrix, based on determining that this element corresponds to an anchor node having a line-of-sight (or most nearly having a line-of-sight) to the area from which the measurements have been collected.

The method continues, as shown at block 720, with calculating measurement variances associated with each diagonal element of the covariance matrix, based on an assumption that the measurement deviations are mean-zero distributed and further based on an assumption that the measurement variance associated with the selected one of the diagonal elements of the covariance matrix is zero. These measurement variances may be used to estimate measurement quality for subsequent measurements corresponding to the respective anchor nodes, for example, or for calculating an uncertainty for a positioning location based on such measurements, or for characterizing multipath effects associated with such measurements, etc.

More generally, it should be appreciated that the covariance matrix can be used for any of several purposes, as described in detail above. Again, these uses apply to a node that calculates the covariance matrix or to a node that receives it from another node. These purposes include calculating a positioning location based on the covariance matrix, where such calculating may be based on any of various nonlinear estimation algorithms, such as extended Kalman filtering, unscented Kalman filtering, particle filtering, and Maximum Likelihood estimation.

Other purposes include determining an estimated measurement quality for a positioning measurement, based on the measurement deviations; this may include using aggregated measurement deviations for an area of interest to determine measurement quality for a positioning measurement corresponding to the area of interest, in some embodiments. In some cases this estimated measurement quality may be used to weight the positioning measurement in a position calculation, for example.

Note that in some of these embodiments, the node may first determine whether the measurement deviations include at least a threshold number of measurement deviations before using the measurement deviations to determine the estimated measurement quality. Further, determining the estimated measurement quality may, in some cases, include weighting one or more of the measurement deviations, based on a measurement age, before using the aggregating measurement deviations to determine the estimated measurement quality. In some embodiments, the estimated measurement quality is compared to a threshold to determine whether or not to omit the corresponding positioning measurement from a positioning calculation. In some embodiments, the estimated measurement quality is used to select a positioning technique, and or to configure a measurement request, or is compared to a reported measurement quality received from a measuring node to verify the reported measurement quality.

Figure 2:
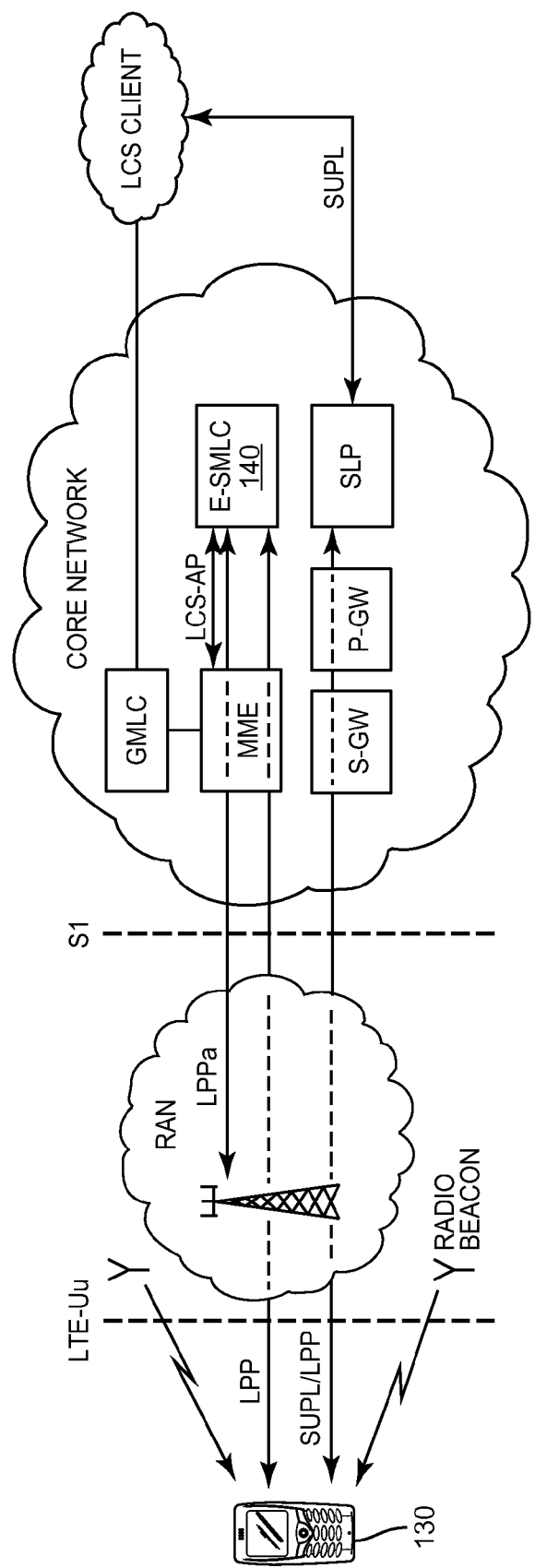
FIG. 2 is another diagram of an example network configured according to the LTE positioning architecture.

Although the techniques described above may be implemented in any appropriate type of telecommunication system, supporting any suitable communication standards and using any suitable components, particular embodiments of the described solutions may be implemented in an LTE network, such as in any of several of the nodes illustrated in FIGS. 1 and 2.

The example network may further include any additional elements suitable to support communication between wireless devices or between a wireless device and another communication device (such as a landline telephone). Although each of the illustrated network nodes in FIGS. 1 and 2 may represent a network communication device that includes any suitable combination of hardware and/or software, these network nodes may, in particular embodiments, represent a device such as the example network node 800 illustrated in FIG. 8.

Figure 8:
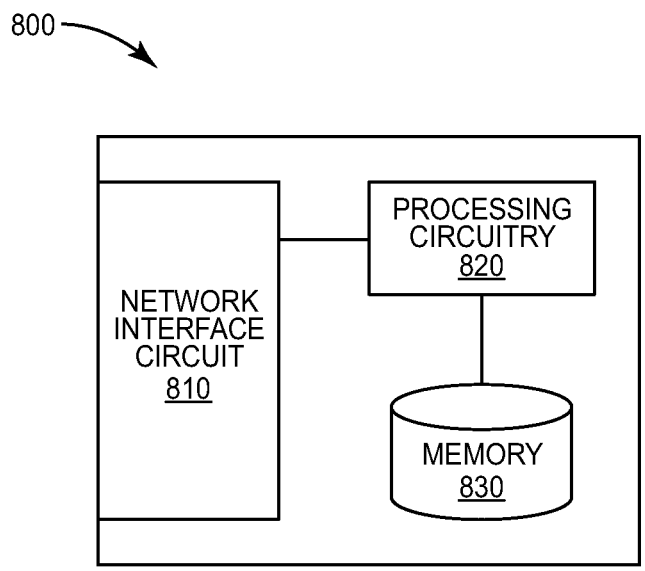
FIG. 8 is a block diagram illustrating several components of an example network node, according to some embodiments of the present invention.

As shown in FIG. 8, the example network node 800 includes processing circuitry 820, a memory 830, and network interface circuitry 810. In particular embodiments, some or all of the functionality described above as being provided by a network node may be provided by processing circuitry 820 executing instructions stored on a computer-readable medium, such as the memory 830 shown in FIG. 8. Alternative embodiments of the network node 800 may include additional components beyond those shown in FIG. 8 that may be responsible for providing certain aspects of the node's functionality, including any of the functionality described above and/or any functionality necessary to support the solution described above.

More particularly, embodiments of the present invention include an estimating node having a configuration like that illustrated in FIG. 8, e.g., including a network interface 810 adapted for communication with one or more other network nodes as well as processing circuitry 820, where the processing circuitry 820 is adapted to collect timing measurements or ranging measurements, determine measurement deviations for each measurement, and use the measurement deviations for estimating measurement quality for one or more subsequent positioning measurements, estimating uncertainty associated with one or more subsequent positioning estimates, and/or estimating effects of multipath on subsequent positioning measurements or estimates.

Processing circuit 820 may include one or more microprocessors or microcontrollers, as well as other digital hardware, which may include digital signal processors (DSPs), special-purpose digital logic, and the like. Either or both of the microprocessor(s) and the digital hardware may be configured to execute program code stored in memory, along with radio parameters. The program code stored in this memory, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the several techniques described above. Because the various details and engineering tradeoffs associated with the design of baseband processing circuitry for wireless base stations and other wireless devices are well known and are unnecessary to a full understanding of the invention, additional details are not shown here.

Accordingly, in various embodiments of the invention, processing circuits, such as the processing circuits 820 of FIG. 8, are configured to carry out one or more of the techniques described above for assisting in the positioning of a target UE. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Accordingly, in various embodiments of the invention, processing circuits, such as the processing circuits 620 of FIG. 6, are configured to carry out one or more of the techniques described above for assisting in the positioning of a target UE. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Several advantages may be achieved using the various techniques and apparatus described above. Some of the advantages provided by some embodiments of the invention are:

more accurate position calculation, using more reliable measurement quality estimates;
the possibility to determine positioning measurement quality in a node not performing measurements
the possibility to obtain positioning measurement quality in a unified way for different wireless devices;
the possibility to obtain multipath channel profile from positioning calculation.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation. The present embodiments are thus to be considered in all respects as illustrative and not restrictive.

What is claimed is:

1. A method, in a first node in a wireless communications network, for use in positioning, the method comprising:
    collecting, for each of a plurality of wireless devices, one or more timing measurements, each measurement corresponding to at least one anchor node antenna having a known location;
    determining a measurement deviation for each measurement by comparing the measurement to an expected timing measurement corresponding to a reference location; and
    using the measurement deviations for one or more of estimating measurement quality of one or more subsequent positioning measurements, estimating uncertainty associated with one or more subsequent positioning estimates, and estimating an effect of multipath on one or more subsequent positioning measurements or estimates.

2. The method of claim 1, wherein said collecting comprises receiving the measurements from one or more measuring nodes or network nodes, retrieving the measurements from a database, or reading the measurements from a computer-readable medium.

3. The method of claim 1, further comprising aggregating measurement deviations separately for each of two or more areas of interest.

4. The method of claim 1, wherein said using the measurement deviations comprises sending one or more of the measurement deviations to a second node for use by the second node for one or more of estimating measurement quality for one or more subsequent positioning measurements, estimating uncertainty associated with one or more subsequent positioning estimates, and estimating an effect of multipath on one or more subsequent positioning measurements or estimates.

5. The method of claim 1, wherein said using the measurement deviations comprises calculating a covariance matrix from the measurement deviations, such that each row and column in the covariance matrix corresponds to one of the anchor node antennas.

6. The method of claim 5, wherein said using the measurement deviations comprises sending the covariance matrix to a second node for use by the second node for one or more of estimating measurement quality for one or more subsequent positioning measurements, estimating uncertainty associated with one or more subsequent positioning estimates, and estimating an effect of multipath on one or more subsequent positioning measurements or estimates.

7. The method of claim 5, further comprising using all or a portion of the covariance matrix to determine statistical information or multipath effects for measurements corresponding to a particular one of the anchor node antennas.

8. The method of claim 7, wherein determining statistical information corresponding to a particular one of the anchor node antennas comprises calculating measurement variances associated with each diagonal element of the covariance matrix, based on an assumption that the measurement deviations are mean-zero distributed and further based on an assumption that the measurement variance associated with one of the diagonal elements of the covariance matrix is zero.

9. The method of claim 8, further comprising selecting the one of the diagonal elements based on determining that the one of the diagonal elements corresponds to an anchor node antenna having a line-of-sight to an area from which the measurements are collected.

10. The method of claim 5, further comprising calculating a positioning location based on the covariance matrix.

11. The method of claim 10, wherein said calculating of the positioning location is based on a nonlinear estimation algorithm selected from the following:
    extended Kalman filtering;
    unscented Kalman filtering;
    particle filtering; and
    Maximum Likelihood estimation.

12. The method of claim 1, further comprising determining an estimated measurement quality for a positioning measurement, based on the measurement deviations.

13. The method of claim 12, wherein determining the estimated measurement quality comprises using aggregated measurement deviations for an area of interest to determine measurement quality for a positioning measurement corresponding to the area of interest.

14. The method of claim 12, further comprising determining whether the measurement deviations include at least a threshold number of measurement deviations before using the measurement deviations to determine the estimated measurement quality.

15. The method of claim 12, wherein determining the estimated measurement quality comprises weighting one or more of the measurement deviations based on a measurement age, before aggregating the measurement deviations to determine the estimated measurement quality.

16. The method of claim 12, further comprising omitting the positioning measurement from a positioning calculation, based on a comparison of the estimated measurement quality to a threshold.

17. The method of claim 12, further comprising selecting a positioning method based on the estimated measurement quality.

18. The method of claim 12, further comprising configuring a measurement request based on the estimated measurement quality.

19. The method of claim 12, further comprising comparing the estimated measurement quality to a reported measurement quality received from a measuring node, to verify the reported measurement quality.

20. The method of claim 12, further comprising using the estimated measurement quality to weight the positioning measurement in a position calculation.

21. A method, in a second node in a wireless communications network, for using measurement quality information in positioning, the method comprising:
  receiving measurement deviations, for each of a plurality of wireless devices, from a first node, wherein said measurement deviations correspond to a plurality of timing measurements, each measurement deviation corresponding to at least one anchor node antenna having a known location; and
  using the received measurement deviations for one or more of estimating measurement quality of one or more subsequent positioning measurements, estimating uncertainty associated with one or more subsequent positioning estimates, and estimating an effect of multipath on one or more subsequent positioning measurements or estimates.

22. The method of claim 21, wherein the received measurement deviations are aggregated separately for each of two or more areas of interest.

23. The method of claim 21, wherein said using the measurement deviations comprises calculating a covariance matrix from the measurement deviations, such that each row and column in the covariance matrix corresponds to one of the anchor node antennas.

24. The method of claim 21, further comprising receiving a covariance matrix from the first node, wherein the covariance matrix corresponds to the measurement deviations and wherein each row and column in the covariance matrix corresponds to one of the anchor node antennas.

25. The method of claim 23, wherein said using the measurement deviations further comprises using all or a portion of the covariance matrix to determine statistical information or multipath effects for measurements corresponding to a particular one of the anchor node antennas.

26. The method of claim 25, wherein determining statistical information corresponding to a particular one of the anchor node antennas comprises calculating measurement variances associated with each diagonal element of the covariance matrix, based on an assumption that the measurement deviations are mean-zero distributed and further based on an assumption that the measurement variance associated with one of the diagonal elements of the covariance matrix is zero.

27. The method of claim 23, wherein said using the measurement deviations further comprises calculating a positioning location based on the covariance matrix.

28. The method of claim 21, wherein said using the measurement deviations comprises determining an estimated measurement quality for a positioning measurement, based on the measurement deviations.

29. The method of claim 28, wherein determining the estimated measurement quality comprises using measurement deviations for an area of interest to determine measurement quality for a positioning measurement corresponding to the area of interest.

30. The method of claim 28, further comprising omitting the positioning measurement from a positioning calculation, based on a comparison of the estimated measurement quality to a threshold.

31. The method of claim 28, wherein said using the measurement deviations further comprises selecting a positioning method based on the estimated measurement quality.

32. The method of claim 28, wherein said using the measurement deviations further comprises comparing the estimated measurement quality to a reported measurement quality received from a measuring node, to verify the reported measurement quality.

33. The method of claim 28, wherein said using the measurement deviations further comprises using the estimated measurement quality to weight the positioning measurement in a position calculation.

34. A node for use in a wireless communication system, the node comprising
  a network interface circuit adapted for communication with one or more other nodes in the wireless communication system, and
  a processing circuit, wherein the processing circuit is configured to:
  collect, for each of a plurality of wireless devices, one or more timing measurements, each measurement corresponding to at least one anchor node antenna having a known location;
  determine a measurement deviation for each measurement by comparing the measurement to an expected timing measurement corresponding to a reference location; and
  use the measurement deviations for one or more of estimating measurement quality of one or more subsequent positioning measurements, estimating uncertainty associated with one or more subsequent positioning estimates, and estimating an effect of multipath on one or more subsequent positioning measurements or estimates.

* * * * *